United States Patent [19]
Hopkins

[15] 3,667,566
[45] June 6, 1972

[54] RELEASABLE CONNECTOR, PARTICULARLY FOR TILT CAB VEHICLES

[72] Inventor: William C. N. Hopkins, P. O. Box 4551, Walnut Creek, Calif. 94596

[22] Filed: May 28, 1970

[21] Appl. No.: 41,182

[52] U.S. Cl. ..............................180/89, 24/211 N, 74/527, 85/5 B, 279/22, 279/75, 285/316, 287/119, 296/28 C, 296/35 R
[51] Int. Cl. ........................................................B62d 27/06
[58] Field of Search ...................296/35 R, 28 C; 180/89; 280/508, 509, 510; 24/211 N; 85/5 B; 74/527 X; 285/277, 316 X; 287/119 X, DIG. 5; 292/252, 261, 193; 339/91 B; 279/22, 73, 23, 77, 30, 78

[56] References Cited

UNITED STATES PATENTS

| 3,497,257 | 2/1970 | Hirst | 296/35 R |
| 2,939,541 | 6/1960 | Smalley | 180/89 |
| 3,430,305 | 3/1969 | Geffner | 24/211 N |

FOREIGN PATENTS OR APPLICATIONS

| 909,247 | 10/1962 | Great Britain | 24/211 N |
| 1,439,918 | 4/1966 | France | 180/89 |
| 971,537 | 9/1964 | Great Britain | 85/5 B |

Primary Examiner—Benjamin Hersh
Assistant Examiner—Leslie J. Paperner
Attorney—Imirie and Smiley

[57] ABSTRACT

A releasable connector comprises a first part in the form of a collar or cup having an internal annular groove and a second part comprising a cylinder and piston jointly defining a latch arrangement insertable into the collar and including an annular expansible-contractable latch member for selectively nesting in said groove and to secure said parts together. The latch arrangement includes an annular latch part having a conical latch face and fixed to the cylinder, and an annular latch part carried by the piston and having a conical latch face jointly defining an annular channel within which the latch member is seated. The width of the channel is varied selectively by movement of the piston to expand the latch member into the groove to secure the parts together or to permit retraction of the latch member so that the two parts can be separated. The connector is particularly adapted for use with tilt cab vehicles, the first part preferably being secured to the cab and the second part being mounted on the vehicle chassis.

20 Claims, 8 Drawing Figures

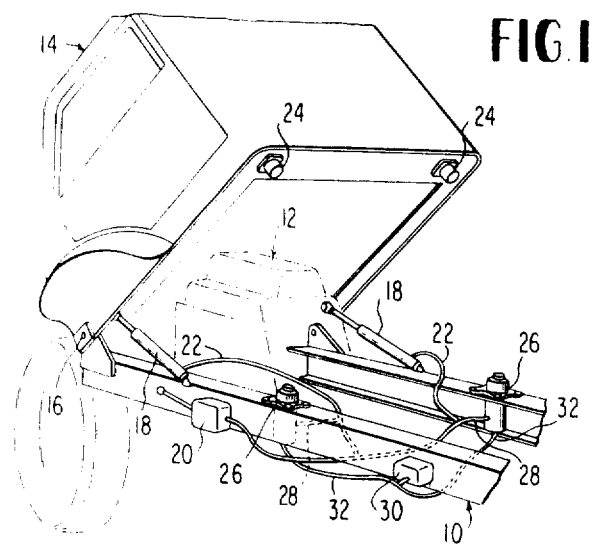
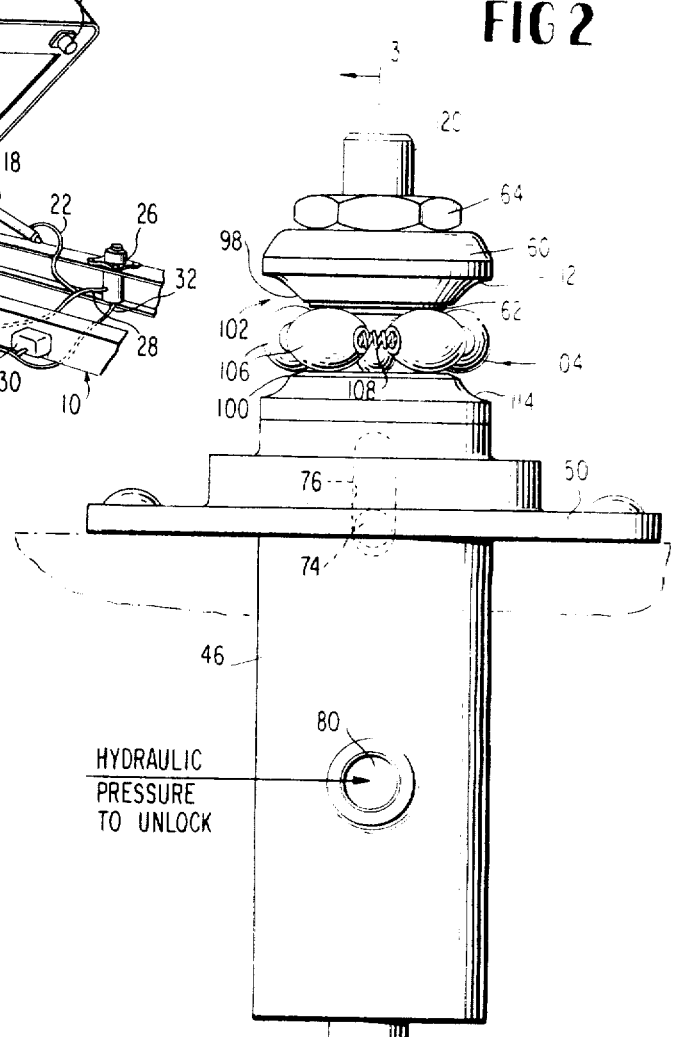
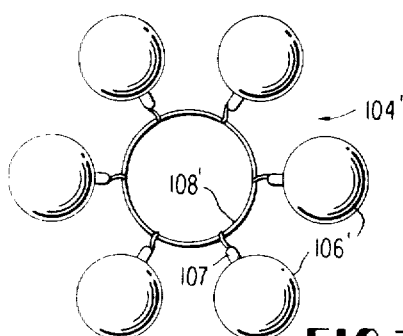
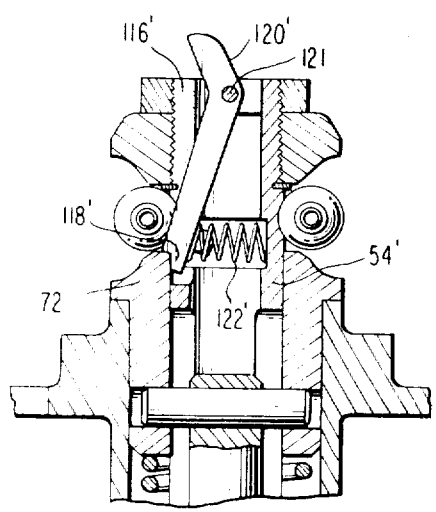

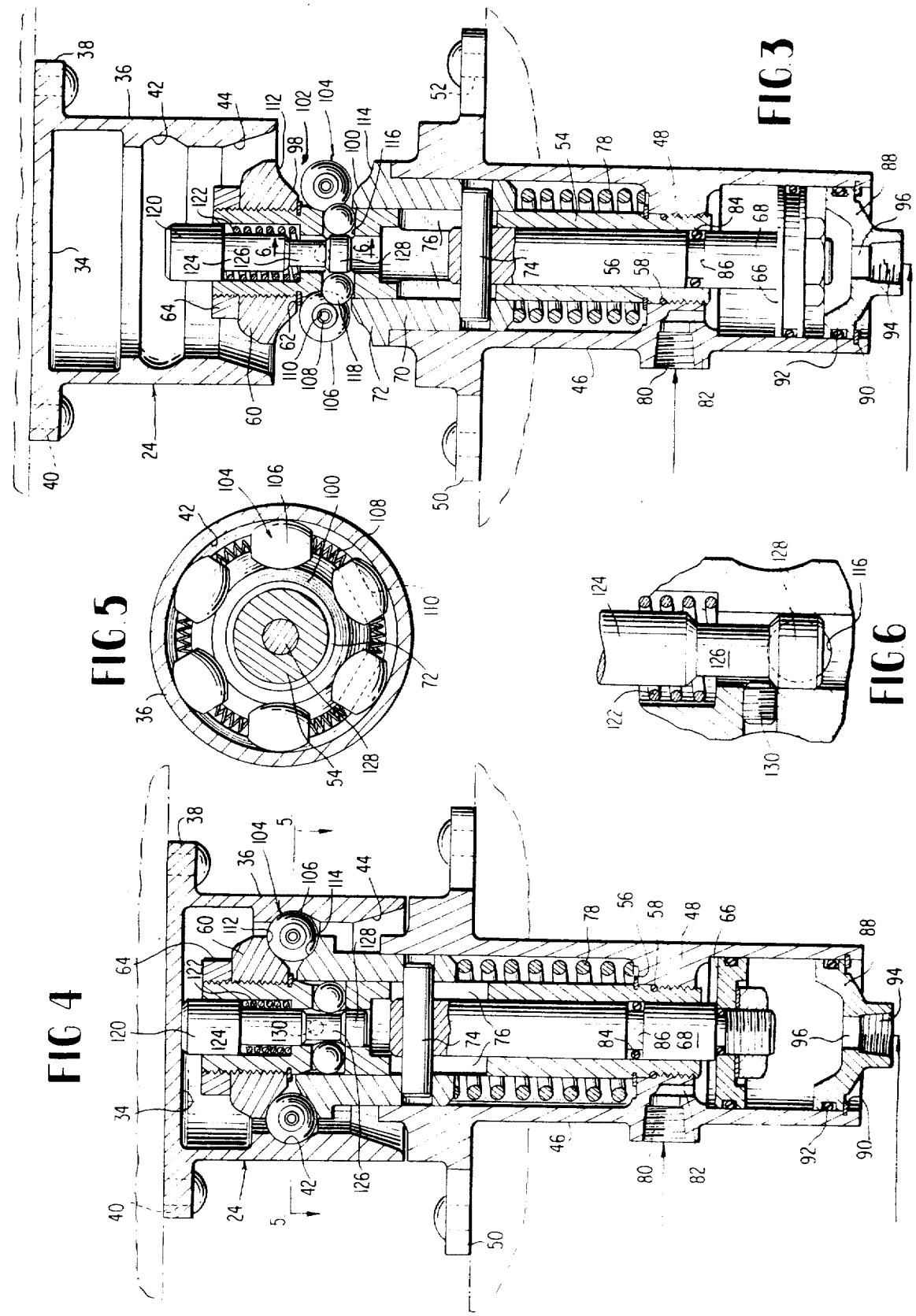

3,667,566

RELEASABLE CONNECTOR, PARTICULARLY FOR TILT CAB VEHICLES

BACKGROUND OF THE INVENTION

Heavy duty load transporting vehicles of the truck or trailer-tractor type embody a cab-over-engine construction to reduce the length of the power-control portion with a consequent increase of length of the load carrying portion. The cab is hingedly mounted along one edge thereof, usually the forward or front edge, to the vehicle chassis to enable tilting of the cab from operative or driving position to give access to the engine for service and repair thereof, latch means being provided between the cab and chassis at the cab edge portion opposite the hinged edge for retaining the cab in operative position.

The latch means presently used are manually operated and as a consequence an inefficient operator may neglect to secure the latch means or improperly manipulate the control element so that the latch means is not properly secured. Moreover, the latch means now in use lacks sufficient strength and/or sufficient positive action to withstand the tremendous forces that may be generated in an emergency. As a result, in the event of an emergency when the vehicle is moving at a sufficient speed, and/or down an incline and the driver must suddenly apply the brakes, the forces generated can be sufficient to cause failure of the latch means and tilting of the cab out of operative position with consequent loss of control of the vehicle that may result in loss of both property and life.

SUMMARY OF THE INVENTION

A releasable connector according to the present invention comprises two separable latch parts or portions including latch means that is operated automatically to secure the parts together when the parts are juxtaposed in operative relation.

One of the connector or coupler portions comprises a collar having an internal circumferential groove and the other of the coupler portions comprises a cylinder having a fixed annular latch part with a generally conical latch face. A piston mounted in said cylinder and having an annular latch part with a generally conical latch face opposed to said first mentioned latch face jointly defines with the latch face on the fixed part of an annular channel, and an annular latch member mounted in said channel includes an elastic ring connecting a plurality of latch elements.

The piston is moveable within said cylinder relative to said fixed latch part to vary the width of said channel and the relative radial displacement of said latch elements. The internal diameter of the collar is at least as great as the diameters of said annular latch parts to receive the latter for alignment of said channel with said groove. Means constantly urge the piston toward said rigid latch part to narrow said channel and force said latch elements radially outwardly into said groove to secure the two coupler portions together.

Means are provided for moving said piston from said rigid latch part to widen said channel and permit radial retraction of said latch elements from said groove and permit separation of said coupler portions. Lock means retains the moveable latch part in retracted, releasable position when the coupler portions are separated and the lock means is controlled by a trigger that is actuated by juxtapositioning the coupler portions to immediately effect operation of the latch mechanism to secure the two coupler portions together. The connector is particularly adapted to secure in operative position in the cab of a tilt cab vehicle and in this association the collar is secured to the cab and the cylinder is secured to the vehicle chassis.

BRIEF DESCRIPTION OF DRAWINGS

FIG. 1 is a fragmentary perspective view of a tilt-cab vehicle with the cab in tilted, inoperative position to expose the vehicle engine;

FIG. 2 is a side view in elevation of the latch support part of a releasable connector, according to the present invention, in released condition;

FIG. 3 is a cross-sectional view of a complete connector according to the present invention, taken on line 3—3 of FIG. 2;

FIG. 4 is a cross-sectional view similar to that of FIG. 3 but showing the connector in latched position;

FIG. 5 is a cross-sectional view taken on line 5—5 of FIG. 4;

FIG. 6 is a cross-sectional view taken on line 6—6 of FIG. 3;

FIG. 7 is a plan view of a modification of the latch member; and,

FIG. 8 is a fragmentary cross-sectional view of a modified latch construction and trigger mechanism for automatically operating the latch to secure the connector parts together.

DETAILED DESCRIPTION OF THE INVENTION

Referring now in detail to the drawings, FIG. 1 shows a typical tilt-cab vehicle construction including a wheeled chassis 10 mounting an engine 12 for powering the vehicle and an operator's or driver's cab 14 mounted on the chassis over the engine 12. The cab 14 is pivotally mounted on the chassis at its front or forward end by hinge means 16 and is moveable between operative, driving position resting fully on the chassis 10 over the engine 12, as shown, by jacks 18 operated by the vehicle fluid pressure or hydraulic system including control valve means 20 and fluid pressure lines 22, releasable connector means 24, 26 being provided between the side or edge portion of the cab 14 opposite the hinge means 16 for securing the cab 14 in operative position.

The foregoing description sets forth a typical tilt-cab vehicle structure and the present invention is directed particularly to the connector means and the control thereof. Briefly, according to the present invention, the connector means 26 includes a piston operated latch mechanism that automatically is actuated, as by spring pressure, when the connector means 24, 26 are juxtaposed in operative position to secure the two parts together, and fluid pressure means operable on the piston to deactivate the latch means to permit separation of the connector parts.

For the latter purpose, pressure lines 28 respectively are connected between the lines 22 and the connector parts 26 so that the connector latch means is released immediately upon application of fluid pressure to the jacks 18 for lifting the cab 14. Preferably, the jacks 18 are operated by hydraulic fluid pressure and if the vehicle also has a source of air pressure this may be supplied by a control device 30 and lines 32 to the connector parts 26 to assist in expelling the hydraulic fluid to facilitate the automatic operation of the latch means when the connector parts are operatively juxtaposed.

The structure of the connector according to the invention is best shown in FIGS. 2—6, and it will be seen in FIGS. 3 and 4 that the connector part 24 comprises an inverted cup including a base 34, a collar 36 and attachment means 38. For use in the hereinbefore described environment the attachment means can comprise a flange extension 38 of the base 34 and having holes 40 for receiving bolts for securing the part 24 to the base of a cab 14. However, the attachment means can be varied for use of the connector in other environments or associations. The internal surface of the collar 36 is provided with an annular groove 42, constituting the latch portion of the part 24, and a taper 44 to its free edge to facilitate juxtaposition of the part 24 with the part 26.

The connector part 26 comprises a cylinder 46 having an inner internally threaded collar 48 intermediate its length and attachment means 50 adjacent its upper end. Again, the attachment means may be varied according to the use to which the connector may be adapted, but for the present purpose is shown as a flange 50 having bolt holes 52 for attachment to the vehicle chassis 10. A sleeve is disposed axially within the cylinder 46 and has its lower end threaded in the collar 48 to the limit imposed by a snap ring 56, and an O-ring seal 58 is interposed between the sleeve and collar at the upper end of the threaded connection. An annular latch part 60 is threaded onto the upper end of the sleeve 54 to the limit imposed by snap ring 62 and secured by a lock nut 64.

A piston assembly is moveable within the connector part 26 and includes a piston head 66 operable within the cylinder 46 below the collar 48, a piston rod 68 having its lower end secured to the piston head 66 and extending partially through and axially of the sleeve 54, an annular sleeve piston 70 disposed between the cylinder 46 and sleeve 54 and carrying an annular latch part 72 beyond the upper end of the cylinder 46, and a cross-pin 74 connecting the upper end of the rod 68 and annular piston 70, said pin 74 being slidable in diammetrically disposed, axially extending slots 76 in the sleeve 54.

A coiled spring 78 is interposed between the collar 48 and cylindrical piston 70 to constantly urge the latch part 72 toward the latch part 60, and an internally threaded socket 80 opening through the exterior of the cylinder 46 and connected by a passageway 82 to the interior of the cylinder 46 between the collar 48 and piston head 66 is adapted to receive the nipple of a pressure line and supply pressure fluid against the piston head 66 to withdraw the latch part 72 from the latch part 60. An O-ring 84 is seated in an annular groove 86 in the piston rod 68 to inhibit escape of pressure fluid between the rod and the sleeve 54. A closure member 88 is secured in the lower end of the cylinder 46 by a snap ring 90 and sealed by an O-ring 92. This closure member 88 has an internally threaded socket 94 and passageway 96 for admitting air to the cylinder 46 below the piston. The socket 94 can receive a vent or valve mechanism, or the nipple of a pressure line if air under pressure is available.

The latch parts 60 and 72 are provided with opposing, generally conical faces 98 and 100, respectively, which jointly define a variable annular channel 102 within which is mounted an annular expansible-contractable latch member 104. As better shown in FIG. 5, the latch member 104 comprises a plurality of ball-like elements 106 connected by an elastic ring 108, which, preferably, is constituted by an endless coiled spring. For the present purpose, as a cab lock, where swivelling action is unnecessary and even undesirable because of wear on the various latch parts, the latch elements 106 are ovoid in configuration and have an axial bore 110 through which the ring 108 is threaded. Moreover, the latch faces 98 and 100 each have a concave annular portion 112, 114 respectively, which conform to the maximum diameter of the elements 106 so that the latter are firmly gripped in operative latched position and rotation of the elements about their axes is prevented.

Preferably, means are provided for locking the moveable latch part in retracted latch-releasing position so as to preclude possible movement of the latch parts to latching position in the event of fluid pressure failure or the like. For this purpose, the sleeve 54 is provided at approximately the level of the moveable latch part in its fully retracted position, with a transverse bore 116 which receives a pair of balls 118 of a diameter slightly greater than the thickness of the sleeve wall so that the balls can protrude inwardly of the inner sleeve wall out of the path of the latch part 72, as shown in FIG. 4, or outwardly of the outer sleeve wall so as to intercept the path of the latch part 72, as shown in FIG. 3. A plunger 120 is slidable within the bore of the sleeve 54 and is biased outwardly by a spring 122 that is interposed between shoulders on the plunger and extending inwardly of the sleeve.

The plunger has a stem portion 124 having an annular groove 126 for receiving the balls 118 in their inner position to permit axial movement of the moveable latch part 72. Beyond the groove 126 the stem includes a head portion 128 adapted to urge and retain the balls 118 outwardly of the stem into the path of the moveable latch part 72 and in this position, the balls 118 are retained within the transverse bore 116 by the latch member 104. The plunger 120 is retained within the sleeve by a set screw 130 threaded through a wall of the sleeve 54 and protruding into the sleeve bore within the area of the annular groove 126 so that upon outer movement of the plunger engagement of the screw 130 with the head 128 prevents complete expulsion of the plunger, as shown in FIG. 6.

In its outer position as shown in FIG. 3, the plunger extends above the sleeve 54 so that its outer free end is in a position to be engaged by the base 34 of the connector part 24 when the latter is moved into connector relationship with the connector part 26. Engagement by the base 34 moves the plunger 120 inwardly of the sleeve 54 until the annular groove 126 is aligned with the balls 118 so that they may be forced inwardly by the moveable latch part 72 to permit movement of the latch part into latching position as shown in FIG. 4. Thus, the plunger constitutes a trigger that is actuated by the cooperating connector part 24 to release the moveable latching part 72 so that the latter immediately can be moved by its spring 78 into latching position. Thus, upon juxtaposition of the connector parts 24 and 26 in connecting relation, they automatically are secured together by operation of the latching mechanism.

Modifications of the various parts of the releasable connector may be made and for example, as shown in FIG. 7, the latch member 104' may comprise a plurality of spherical balls 106' which are secured by eyelet connections 107 to an elastic ring 108' which, in this instance, can comprise a rubber band or the like. Obviously, many variations of the construction and configuration of the latch member 104' is possible.

Another variation, as shown in FIG. 8, may reside in the lock arrangement wherein a trigger 120' replaces the plunger 120. This trigger 120' is adapted to operate within an axially extending slot 116' in the sleeve 54' and is pivotally mounted by a pin 121 extending transversely of the sleeve 54' adjacent the free end of the sleeve. The inner end of the trigger 120' has a notch 118' adapted to engage the upper inner edge of the moveable latch part 72 and the trigger 120' is urged toward locking position by a spring 122' disposed substantially transversely of the bore of the sleeve 54'. In other respects, the trigger 120' is actuated in the same manner as the plunger 120 upon juxtaposition of the connector parts.

OPERATION OF THE INVENTION

It will be understood that although the releasable connector or coupler constituting the present invention is specifically shown and described in association with a tilt-cab vehicle, wherein the coupler constitutes the cab lock, nevertheless, the connector does have uses in other fields such as connecting barges, trailers, or any other articles wherein an exceedingly strong positive action connector is required. Thus, the attachment means 38 and 50 may constitute other structural arrangements depending upon the environment and association with which the connector is to be adapted. Therefore, the specific form of the attachment means 38 and 50 shown herein are not to be construed in a limiting sense.

Assuming that the two connector or coupler parts 24 and 26 are separated, then the respective parts of the latching mechanism incorporated in the cylinder 46 of the part 26 is in the position shown in FIGS. 2 and 3. In other words, the moveable latch part 72 is retracted against its spring 78 and is locked in this position by the balls 118 and plunger head 128, the plunger 120 being expelled to the limit of its stroke from the sleeve 54 by its spring 122 so that the free end of the plunger will be disposed in a position to engage the base 34 of the connector part 24. When the two connector parts 24 and 26 are juxtaposed in coupling relation, the base 34 of the part 24 depresses the plunger 120 until the annular groove 126 is aligned with the balls 118 so that the latter may be forced inwardly by the action of the inner edge of the moveable part 72 working on the inclined spherical surfaces of the balls to cam them inwardly.

As the latching elements 106 are cammed outwardly by movement of the latch part surface 100 toward the surface 98, narrowing the channel 102, the elements 106 finally are seated in the concave annular surfaces 112, 114 on the latch parts 60 and 72 so that the elements 106 are locked against rotation and are prevented from exerting a camming force inwardly that might tend to separate the latch parts 60 and 72 to cause inadvertent release of the connector parts 24 and 26. Moreover, any pressure tending to pull the two portions 24, 26 apart is applied to the fixed latch part 60 and no such pressure is applied to the moveable part 72. Therefore, the two connector parts are firmly secured together automatically upon their being juxtaposed in coupling relationship. As a result, there can be no faulty connection either trough failure on the part of an operator or failure on the part of the mechanical connection.

When it is desired to disconnect the coupler, fluid pressure is applied through the socket 80 and passage 82 into the cylinder 46 against the piston head 66 to retract the moveable latch part 72 until it reaches its extreme retracted position below the level of the transverse bore 116 enclosing the balls 118. The balls 118 are then cammed outwardly by the plunger head 128 due to the action of the spring 122 on the plunger 120 so that the balls are locked in position intercepting the path of the moveable latch part 72. The fluid pressure on the piston head 66 may be of any desired type and provided by any desired means. Preferably, hydraulic fluid is employed, and it may be supplied under pressure by a small hand pump or the like, and even a grease gun is capable of supplying sufficient pressure to move the piston head 66. Once the latch mechanism is locked in released position, then the fluid pressure can be relieved so that the latch mechanism is retained by the locking balls 118 and is not effected by any failure on the part of the fluid pressure system.

When the coupler again is to be secured together, it is merely necessary to bring the coupler parts into juxtaposition to trigger the lock mechanism to latching position by the spring 78. Air is admitted behind the piston head 66 by means of the socket 94 and passage 96 or a vent or valve or air line, if air under pressure is available, secured in the socket 94.

When the coupler is combined with a tilt-cab vehicle, to constitute the cab lock thereof, the coupler part 24 is secured to the cab as previously described and preferably two such parts are secured to the cab, one on each side thereof. Similarly, cooperating coupler parts 26 are secured to the chassis frame for mating with the respective coupler parts 24. In combination with the vehicle and its fluid pressure system which is coupled with the cab tilting jacks 18, branch pressure lines 28 may be coupled in the sockets 80 of the cylinders 46 and if the vehicle also has a source of air under pressure, then air pressure lines 32 may be secured in the sockets 94. In this arrangement, when hydraulic pressure is supplied to the jacks 18 for tilting the cab out of operative position in order to give access to the power plant 12, the fluid pressure is also applied to the piston heads 66 so that the latch mechanism is released simultaneously with the application of pressure to the jacks. Consequently, the cab locks are released so that the cab is free to tilt as soon as sufficient pressure has been applied to the jacks 18 to start the tilting operation.

Needless to say, the pressure necessary to operate the piston heads 66 is less than that required to tilt the cab so that the connectors are disconnected prior to actual movement of the cab. When the cab is tilted back to operative position, there can be certain residual hydraulic pressure against the piston heads 66, and in this event, air under pressure against the underside of the piston heads serves to expell any hydraulic fluid pressure acting on the piston heads 66 so that the latch mechanism is operative as soon as the coupler parts are again juxtaposed in coupling relation.

I claim:
1. In a tilt-cab motor vehicle including;
a chassis, a power unit on said chassis, a cab pivotally mounted on said chassis over said power unit and tiltable between an operative position overlying said power unit and an inoperative position giving access to said power unit, means connected between said cab and chassis for lifting and lowering said cab from and to said operative position, and a cab latch including two releasably connected coupling portions respectively secured to said chassis and cab for retaining said cab in operative position;
the improvement in said cab latch comprising a latch mechanism moveable between latching position securing said coupling portions together and releasing position permitting separation of said portions; said latch mechanism including said latch mechanism comprising latch means on one of said coupling portions and a pair of relatively moveable latch parts defining a recess therebetween on the other of said coupling portions, at least one latch element disposed in said recess between said latch parts and moveable upon movement of said latch parts toward each other from said recess into latching cooperation with said latch means when said coupling portions are juxtaposed together, and elastic means urging said latch element into said recess upon movement of said latch parts from each other to release said latch means and permit separation of said coupling portion;
means for moving said latch mechanism to releasing position to permit separation of said coupling portions; and
means constantly urging said latch mechanism toward latching position and operative upon juxtaposition of said coupling portions to secure said coupling portions together.

2. In a tilt cab vehicle according to claim 1, wherein said other of said coupling portions comprises a housing defining a cylinder, a core fixed to said housing axially of said cylinder and defining an annular space between said core and cylinder, an annular piston reciprocal within said annular space and carrying one of said latch parts, the other of said latch parts being fixed relative to said housing, means in said housing for moving said piston to move said latch parts toward and from each other, means supported by said core for locking said piston in rectracted position when said coupling portions are separated, and trigger means carried by said core for engagement with said one coupling portion to release said piston locking means to permit said piston to actuate said latch mechanism.

3. In a tilt-cab vehicle according to claim 1,
lock mechanism for securing said latch mechanism in releasing position, and
trigger means operable by operative juxtaposition of said coupling portions to release said lock mechanism, whereby said coupling portions automatically are secured together immediately upon operative juxtaposition.

4. In a tilt-cab vehicle according to claim 3, wherein:
one of said coupling portions comprises a collar and said latch means comprises an internal circumferential groove within said collar;
the other of said coupling portions comprising a cylinder having a fixed annular portion defining one said latch part with a generally conical latch face, a piston mounted in said cylinder and having an annular portion defining the other said latch part with a generally conical latch face opposed to said first mentioned latch face jointly define an annular channel constituting said recess, and an annual latch member mounted in said channel and including a plurality of said latch elements connected by said elastic means in an endless ring, said piston being moveable within said cylinder relative to said fixed latch part to vary the width of said channel and the relative radial displacement of said latch elements by said conical latch faces;
the internal diameter of said collar being at least as great as the diameters of said annular latch parts to receive the latter for alignment of said channel with said groove;
means constantly urging said piston toward said rigid latch part to narrow said channel and force said latch elements radially outwardly into said groove to secure said two coupling portions together, and
means for moving said piston from said rigid latch part to widen said channel and permit radial retraction of said latch elements from said groove and permit separation of said latch portions.

5. In a tilt-cab vehicle according to claim 4, wherein
said piston latch part is disposed between said fixed latch part and said cylinder so that said fixed latch part is in advance of said piston when inserted into said collar, whereby forces tending to separate said latch portions are applied only to said fixed latch part.

6. In a tilt-cab vehicle according to claim 5, wherein
said lock mechanism includes lock means moveably supported by said other latch portion in fixed relation to said fixed latch part, and
said trigger means includes resilient means normally urging said trigger means into the path of said collar for operation thereby to release said lock means from said piston as the two coupling portions are moved into operative position.

7. In a tilt-cab vehicle according to claim 4, wherein
said cab tilting means is constituted by fluid pressure means, and
said piston moving means includes a connection between said cylinder and said fluid pressure means, whereby said latch mechanism is released automatically upon application of fluid pressure to tilt said cab.

8. In a tilt-cab vehicle according to claim 7, wherein
said vehicle includes a source of air under pressure, and
a connection between said source and said cylinder in opposition to said piston moving means.

9. In a tilt-cab vehicle according to claim 4, wherein
said latch elements are of a ball-like configuration each having a like maximum diameter disposed radially of the axis of said cylinder,
said conical latch faces including outer annular concave surfaces the radial curvature of which corresponds to the curvature of said maximum diameters of said latch elements to firmly grip the latter.

10. In a tilt-cab vehicle according to claim 9, wherein
said latch elements are ovoid in configuration and each has an axial bore in the longitudinal direction,
the elastic connection between said elements comprising an endless elastic ring threaded through said bores.

11. In a releasable connector including two releasably connected coupling portions and latch mechanism releasably connecting said coupling portions together;
the improvement comprising a latch mechanism moveable between latching position securing said coupling portions together and releasing position permitting separation of said portions; said latch mechanism comprising latch means on one of said coupling portions and a pair of relatively moveable latch parts defining a recess therebetween on the other of said coupling portions, at least one latch element disposed in said recess between said latch parts and moveable upon movement of said latch parts toward each other from said recess into latching cooperation with said latch means when said coupling portions are juxtaposed together, and elastic means urging said latch element into said recess upon movement of said latch parts from each other to release said latch means and permit separation of said coupling portion.

12. In a connector according to claim 11, wherein said other of said coupling portions comprises a housing defining a cylinder, a core fixed to said housing axially of said cylinder and defining an annular space between said core and cylinder, an annular piston reciprocal within said annular space and carrying one of said latch parts, the other of said latch parts being fixed relative to said housing, means in said housing for moving said piston to move said latch parts toward and from each other, means supported by said core for locking said piston in retracted position when said coupling portions are separated, and trigger means carried by said core for engagement with said one coupling portion to release said piston locking means to permit said piston to actuate said latch mechanism.

13. In a connector according to claim 11,
lock mechanism for securing said latch mechanism in releasing position, and
trigger means operable by operative juxtaposition of said coupling portions to release said lock mechanism, whereby said coupling portions automatically are secured together immediately upon operative juxtaposition.

14. In a connector according to claim 13, wherein:
one of said coupling portions comprises a collar and said latch means comprises an internal circumferential groove within said collar;
the other of said coupling portions comprising a cylinder having a fixed annular portion defining one said latch part with a generally conical latch face, a piston mounted in said cylinder and having an annular portion defining the other said latch part with a generally conical latch face opposed to said first mentioned latch face to jointly define an annular channel constituting said recess, and an annular latch member mounted in said channel and including a plurality of said latch elements connected by said elastic means in an endless ring, said piston being moveable within said cylinder relative to said fixed latch part to vary the width of said channel and the relative radial displacement of said latch elements by said conical latch faces;
the internal diameter of said collar being at least as great as the diameters of said annular latch parts to receive the latter for alignment of said channel with said groove;
means constantly urging said piston toward said rigid latch part to narrow said channel and force said latch elements radially outwardly into said groove to secure said two coupling portions together, and
means for moving said piston from said rigid latch part to widen said channel and permit radial retraction of said latch elements from said groove and permit separation of said latch portions.

15. In a connector according to claim 14, wherein
said piston latch part is disposed between said fixed latch part and said cylinder so that said fixed latch part is in advance of said piston when inserted into said collar, whereby forces tending to separate said latch portions are applied only to said fixed latch part.

16. In a connector according to claim 15, wherein
said lock mechanism includes lock means moveably supported by said other latch portion in fixed relation to said fixed latch part, and
said trigger means includes resilient means normally urging said trigger means into the path of said collar for operation thereby to release said lock means from said piston as the two coupling portions are moved into operative position.

17. In a connector according to claim 14, wherein
said latch elements are of a ball-like configuration each having a like maximum diameter disposed radially of the axis of said cylinder,
said conical latch faces including outer annular concave surfaces the radial curvature of which corresponds to the curvature of said maximum diameters of said latch elements to firmly grip the latter.

18. In a connector according to claim 17, wherein
said latch elements are ovoid in configuration and each has an axial bore in the longitudinal direction,
the elastic connection between said elements comprising an endless elastic ring threaded through said bores.

19. In a connector according to claim 14, wherein said piston moving means comprises fluid pressure means.

20. In a connector according to claim 19, comprising air pressure means in said cylinder in opposition to said piston moving means.

* * * * *